(12) United States Patent
Heiney et al.

(10) Patent No.: US 7,436,533 B2
(45) Date of Patent: Oct. 14, 2008

(54) PRINTER DISCOVERY, STATUS AND AUTOMATIC ADDITION OF PRINTER TO PRINT SPOOLER DATABASE

(75) Inventors: Ronald L. Heiney, Longmont, CO (US); Harry Reese Lewis, Jr., Longmont, CO (US); Anthony Franke Stuart, Tampa, FL (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1050 days.

(21) Appl. No.: 10/417,464

(22) Filed: Apr. 16, 2003

(65) Prior Publication Data

US 2004/0207866 A1   Oct. 21, 2004

(51) Int. Cl.
*G06K 15/00* (2006.01)
(52) U.S. Cl. .................................. 358/1.15; 358/1.6
(58) Field of Classification Search ............... 358/1.15, 358/1.9, 1.16, 1.6; 710/16; 709/224, 223, 709/219; 370/254, 256; 369/47.14
See application file for complete search history.

(56) References Cited

U.S. PATENT DOCUMENTS

| | | | | |
|---|---|---|---|---|
| 5,881,213 | A | 3/1999 | Shaw et al. | 395/114 |
| 5,974,234 | A | 10/1999 | Levine et al. | 395/114 |
| 5,978,560 | A | 11/1999 | Tan et al. | 395/114 |
| 6,240,456 | B1 | 5/2001 | Teng et al. | 709/230 |
| 6,426,947 | B1 | 7/2002 | Banker et al. | 370/254 |
| 6,738,631 | B1 * | 5/2004 | Adler et al. | 455/456.6 |
| 6,870,570 | B1 * | 3/2005 | Bowser | 348/552 |
| 7,072,256 | B2 * | 7/2006 | Ueda et al. | 369/47.14 |
| 2002/0138564 | A1 | 9/2002 | Treptow | 709/203 |
| 2002/0196463 | A1 * | 12/2002 | Schlonski et al. | 358/1.15 |
| 2003/0158979 | A1 * | 8/2003 | Tateyama et al. | 710/33 |
| 2004/0143551 | A1 * | 7/2004 | Jong | 705/64 |
| 2004/0176118 | A1 * | 9/2004 | Strittmatter et al. | 455/500 |
| 2004/0184069 | A1 * | 9/2004 | Mifune | 358/1.15 |

FOREIGN PATENT DOCUMENTS

JP    2002116898 A    4/2002
WO   WO 01/35207 A1    5/2001

OTHER PUBLICATIONS

Carl Kugler et al. "Internet Printing Protocol (IPP) Encoding and Transport," *StandardView*, vol. 6, No. 4, Dec. 1998, pp. 157-163.

(Continued)

*Primary Examiner*—Jerome Grant, II
(74) *Attorney, Agent, or Firm*—Duft Bornsen & Fishman, LLP

(57) ABSTRACT

A method, computer program product and print server for discovering printers connected to a print server. A print server may transmit a HyperText Transport Protocol (HTTP) request to every Internet Protocol (IP) address in a range of IP addresses. A response, e.g., a document such as a web page, may be received by the print server from one or more devices at one or more IP addresses in the range of IP addresses. The print server may identify one or more out of these devices that transmitted a response as printers based on analyzing the responses from the devices. The print server may obtain printer attribute information from the identified printers and update a database with the obtained printer attribute information.

18 Claims, 5 Drawing Sheets

OTHER PUBLICATIONS

Peter Michalek et al. "Implementing an IPP Client and Server for Linux," *StandardView*, vol. 6, No. 4, Dec. 1998, pp. 164-171.

F. D. Wright, "Requirements and Design Goals for an Internet Printing Protocol," *StandardView*, vol. 6, No. 4, Dec. 1998, pp. 172-179.

* cited by examiner

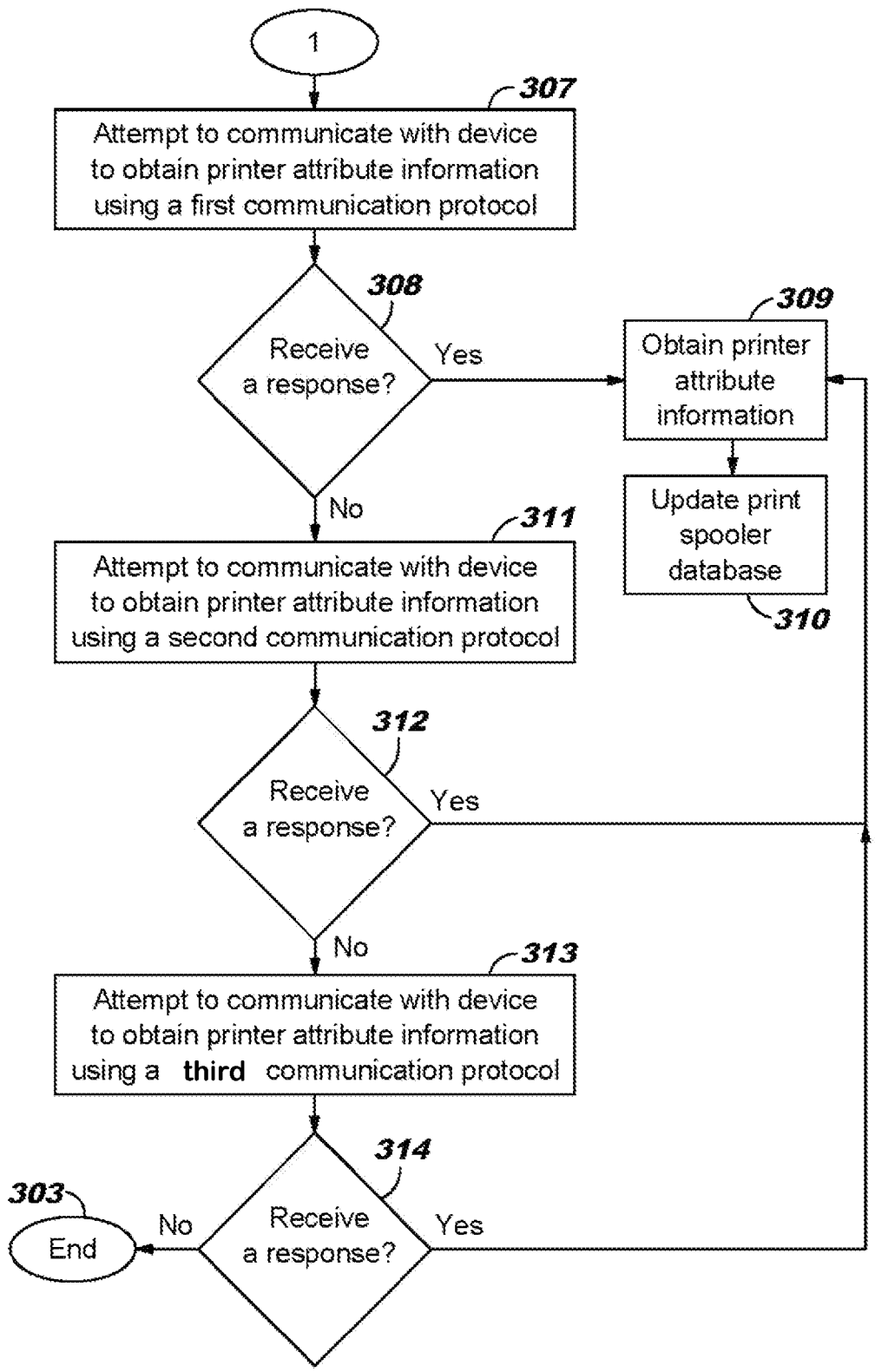

PRINTER DISCOVERY, STATUS AND AUTOMATIC ADDITION OF PRINTER TO PRINT SPOOLER DATABASE

TECHNICAL FIELD

The present invention relates to the field of print spooler systems, and more particularly to discovering printers connected to a print server in a print spooler system and automatically adding printer attributes of such discovered printers to the print spooler database.

BACKGROUND INFORMATION

In a large scale distributed print spooler system, large number of printers, e.g., thousands of printers, may be connected to a print server configured to control these printers. The print server may also be connected to a large number of computers, e.g., personal computers, with software applications, e.g., word processing, that transmit print requests to the print server to print documents. Typically, the print server includes software, commonly referred to as a "print spooler," that manages the printing of the received print images.

In a large scale distributed print spooler system, the print server may not be able to discover the addition of printers to the network. Consequently, when printers are added in a large scale distributed print spooler system, the attributes of the added printer may have to be manually added to a database, commonly referred to as a print spooler database, in the print server. Some examples of printer attributes may include the type of printer, the location of the printer, text printing attributes, raster printing attributes, vector printing attributes, command attributes, feature attributes, and option attributes. Manually adding the printer attributes of a significant number of printers may be time consuming and prone to errors.

In some print spooler systems, the print server may be able to locate printers connected to the print server using a specific, not widely available, protocol such as Service Location Protocol (SLP), Service Support Transfer Protocol (SSTP) or RVP (RendezVous Protocol). However, in a large distributed print spooler system, using such protocols may not be practical in locating printers connected to the print server as each printer may respond to different specific protocols.

Therefore, there is a need in the art to locate printers in a large scale distributed print spooler system using a widely available protocol, e.g., HyperText Transport Protocol (HTTP), and automatically adding the printer (printer attributes) to the print spooler database.

SUMMARY

The problems outlined above may at least in part be solved in some embodiments by a print server transmitting a HyperText Transport Protocol (HTTP) request to every Internet Protocol (IP) address in a range of IP addresses. The print server may then determine if one or more of the devices, which responded to the HTTP request, are printers. In one embodiment, the print server may determine if the responding devices are printers by searching for one or more key words, e.g., printer, in the web page(s) received from the devices. If the print server identifies such key word(s) in the received web page(s) from the devices, then it may be concluded that such devices are likely to be printers. The print server may obtain printer attribute information from such devices and update a print spool database in the print server with such printer attribute information.

In one embodiment of the present invention, a method for discovering printers connected to a print server may comprise the step of transmitting an inter networking communication protocol request to every Internet Protocol (IP) address in a range of IP addresses. The method may further comprise receiving a response from one or more devices at one or more IP addresses in the range of IP addresses. The method may further comprise identifying one or more of the devices as printers based on analyzing the responses from the one or more devices. The method may further comprise obtaining printer attribute information from the one or more devices identified as printers. The method may further comprise updating a database with the obtained printer attribute information.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and print server for discovering printers connected to the print server in an information handling system. In one embodiment of the present invention, a print server may transmit an inter networking communication protocol request, e.g., HyperText Transport Protocol (HTTP) request, to every Internet Protocol (IP) address in a range of IP addresses. A response may be received by the print server from devices at one or more IP addresses in the range of IP addresses. One or more of the devices that transmitted a response are identified as printers by the print server based on analyzing the responses from the one or more devices. The print server may obtain printer attribute information from the one or more devices identified as printers. The print server may update a database with the obtained printer attribute information.

Although the present invention is described with reference to the HTTP protocol, it is noted that the present inventive principles do not depend on the particular communication transport protocol and that the use of HTTP is exemplary.

In the following description, numerous specific details are set forth such as specific protocols to provide a thorough understanding of the present invention. However, it will be apparent to those skilled in the art that the present invention may be practiced without such specific details. In other instances, well-known circuits and devices, e.g., personal computers, hand-held computers, routers, have been shown in block diagram form in order not to obscure the present invention in unnecessary detail. For the most part, details considering timing considerations and the like have been admitted inasmuch as such details are not necessary to obtain a complete understanding of the present invention and are within the skills of persons of ordinary skill in the relevant art.

Figure 1:
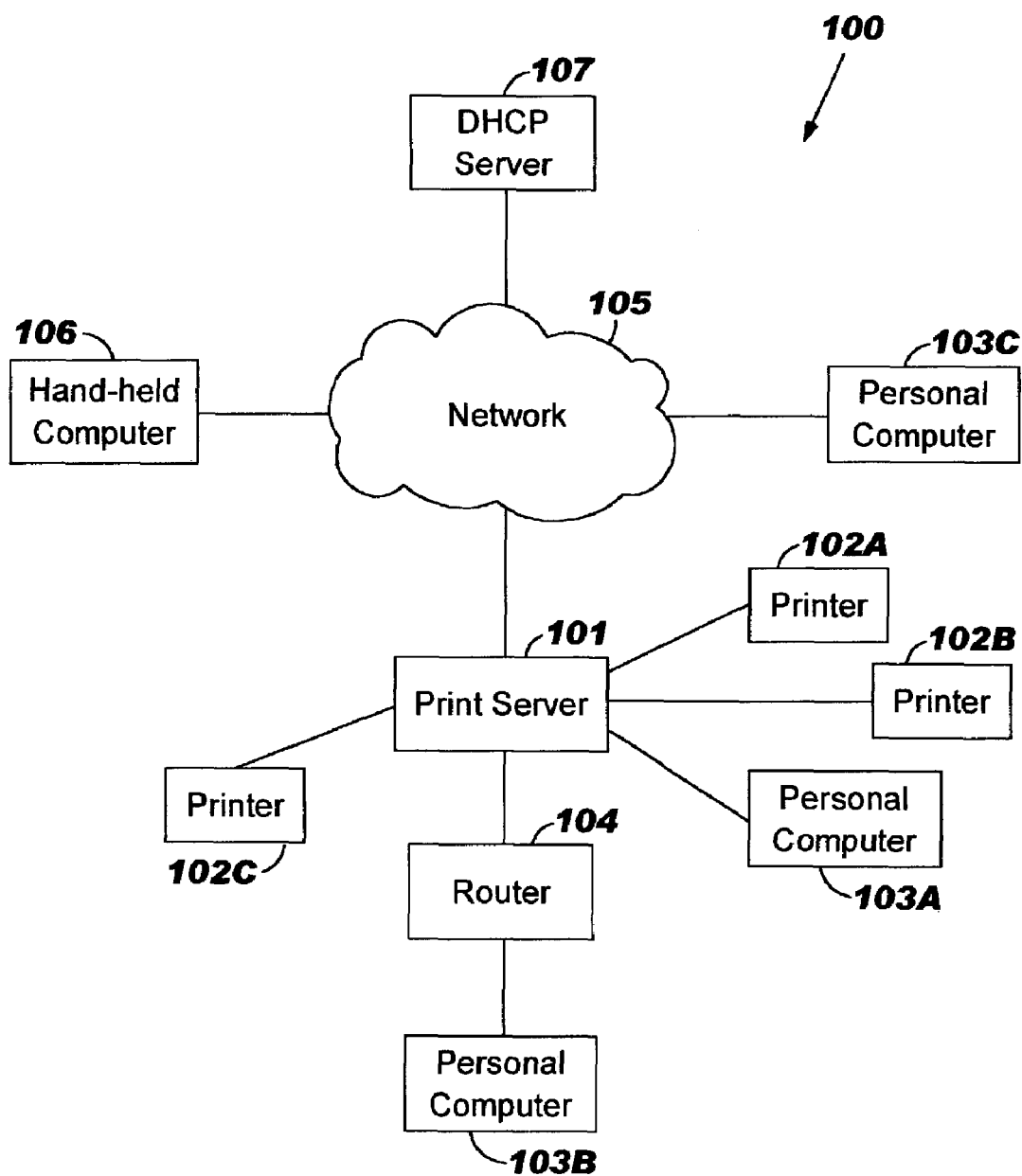
FIG. 1 illustrates a print spooler system configured in accordance with an embodiment of the present invention.

FIG. 1—Print Spooler System

FIG. 1 illustrates an embodiment of a print spooler system 100 in accordance with the present invention. System 100 may comprise a print server 101 configured to control printers 102A-C connected to print server 101. Print server 101 is described further below in conjunction with FIG. 2. Printers 102A-C may collectively or individually be referred to as printers 102 or printer 102, respectively. Printers 102 may comprise a memory (not shown), e.g., non-volatile memory, to store a program to enable printer 102 to function as a "web server" where "web server" refers to the ability of providing World Wide Web services, e.g., manage HyperText Transport Protocol (HTTP) requests, delivering documents (web pages) in HyperText Markup Language (or any other markup language) format. Print server 101 may further be connected to personal computers 103A-C via router 104 or network 105. Network 105 may be a Local Area Network (LAN), e.g., Ethernet, Token Ring, ARCnet, or a Wide Area Network (WAN), e.g., Internet. Print server 101 may further be connected to a hand-held computer 106, e.g., Personal Digital Assistant (PDA), palmtop, smart phone, pocket PC, via network 105. Print server 101 may further be connected to a server 107, e.g., Dynamic Host Configuration Protocol (DHCP) server, via network 105. Server 107 may be configured to assign Internet Protocol (IP) address to newly added devices, e.g., routers, servers, personal computers, to system 100. Server 107 may further be configured to transmit the IP address assigned to a newly added device to system 100 to print server 101 as discussed in greater detail in conjunction with FIG. 4. Server 107 is described further below in conjunction with FIG. 2. It is noted that one of ordinary skill in the art will readily recognize that print spooler system 100 may include other and/or additional devices that, for clarity, are not depicted. It is further noted that system 100 may be any type of system that has at least one print server 101 and at least one printer 102 and that FIG. 1 is not to be limited in scope to any one particular embodiment. It is further noted that FIG. 1 is illustrative of the many devices, e.g., routers, servers, computers, that may be connected to print server 101 other than printers 102.

Figure 2:
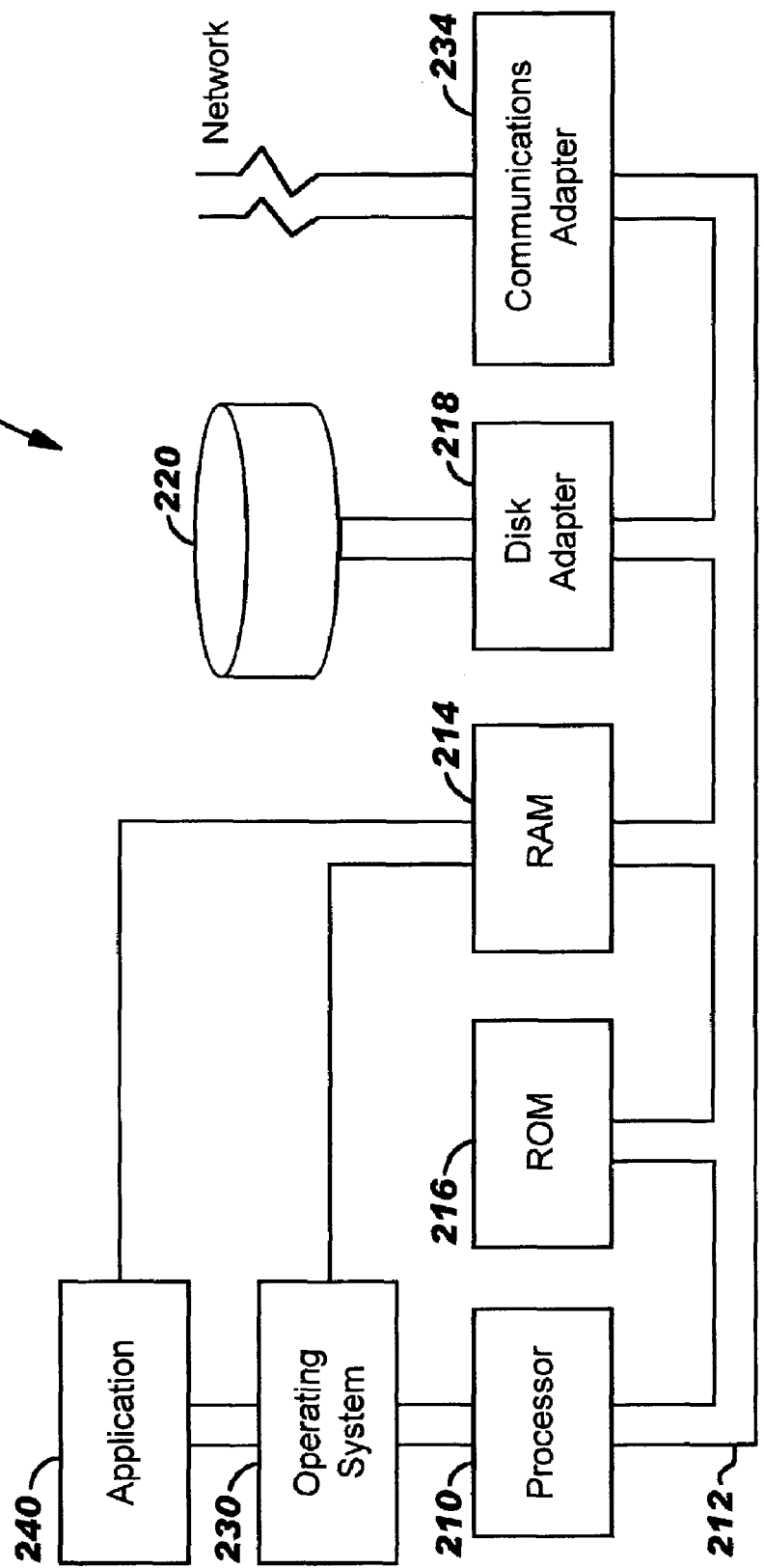
FIG. 2 illustrates a print server and a DHCP server configured in accordance with an embodiment of the present invention.

FIG. 2—Hardware Configurations of Print Server and DHCP Server

FIG. 2 illustrates an embodiment of the present invention of print server 101 and server 107. Print server 101 may comprise a processor 210 coupled to various other components by system bus 212. An operating system 230 may run on processor 210 and provide control as well as coordinate the function of the various components of FIG. 2. An application 240 in accordance with the principles of the present invention may run in conjunction with operating system 230 and provide calls to operating system 230 where the calls implement the various functions or services to be performed by application 240. An application 240 in print server 101 may include, for example, a program for detecting printers 102 connected to print server 101 and adding printer attributes of such printers 102 to a print spooler database as described in association with FIGS. 3-4. It is noted that the steps of the method for detecting printers 102 connected to print server 101 and adding printer attributes of such printers 102 to a print spooler database performed by the program mentioned above may in an alternative embodiment be implemented in hardware such as in an Application Specific Integrated Circuit (ASIC). An application 240 in server 107 may include, for example, a program for assigning IP addresses to newly added devices in system 100 and transmitting newly assigned IP addresses to print server 101 as described in association with FIG. 4. Read only memory (ROM) 216 may be coupled to system bus 212 and include a Basic Input/Output System ("BIOS") that controls certain basic functions of print server 101 and server 107. Random access memory (RAM) 214, disk adapter 218 and communications adapter 234 may also be coupled to system bus 212. It should be noted that software components including operating system 230 and application 240 may be loaded into RAM 214 which may be the main memory for print server 101. RAM 214 in printer server 101 may be further configured to store databases such as a print spooler database configured to store attributes, e.g., type of printer, location of printer, text printing attributes, raster printing attributes, vector printing attributes, command attributes, feature attributes, option attributes, of printers 102 connected to print server 101. Disk adapter 218 may be an integrated drive electronics ("IDE") adapter that communicates with disk units 220. It is noted that the program of the present invention in print server 101 that detects printers 102 connected to print server 101 and adds printer attributes of such printers 102 to a print spooler database as described in FIGS. 3-4 may reside in disk drive 220 or in application 240. It is further noted that the program of the present invention in server 107 that assigns IP addresses to newly added devices in system 100 and transmits newly assigned IP addresses to print server 101 as described in FIG. 4 may reside in disk drive 220 or in application 240. It is further noted that disk drive 220 in print server 101 may be configured to store databases such as a print spooler database described above. Communications adapter 234 in print server 101 may enable print server 101 to communicate with any device, e.g., printer 102, personal computer 103, router 104, hand-held computer 106, server 107, connected to print server 101. Communications adapter 234 in server 107 may enable server 107 to communicate with any device, e.g., printer 102, personal computer 103, router 104, hand-held computer 106, print server 101, connected to server 107.

Implementations of the invention include implementations as a computer system programmed to execute the method or methods described herein, and as a computer program product. According to the server implementations, sets of instructions for executing the method or methods may be resident in the random access memory 214 of one or more computer systems configured generally as described above. Until required by print server 101 and server 107, the set of instructions may be stored as a computer program product in another computer memory, for example, in disk drive 220 (which may include a removable memory such as an optical disk or floppy disk for eventual use in disk drive 220). Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
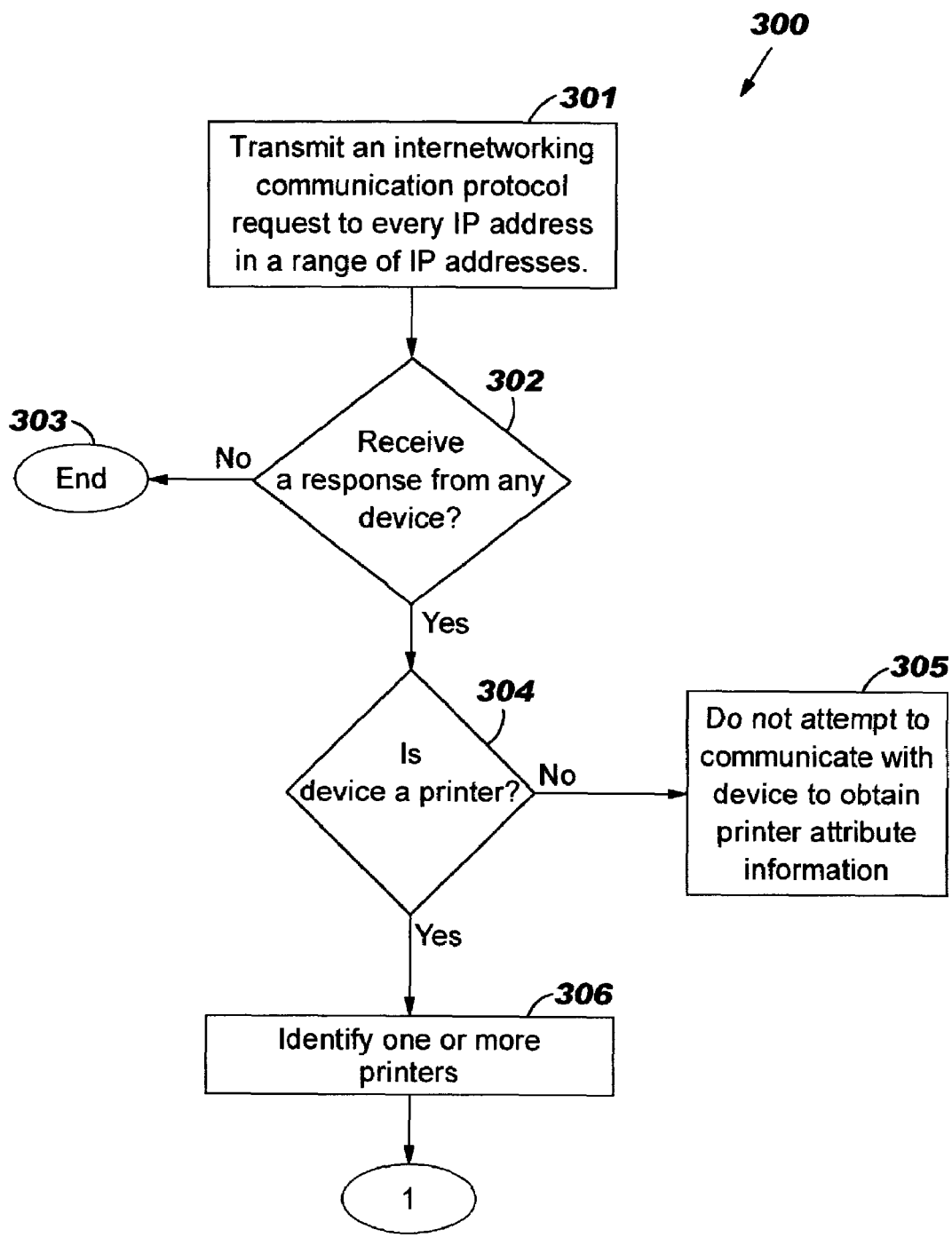
FIG. 3 is a flowchart of a method for detecting printers connected to a print server and automatically adding printer attributes of such detected printers to a print spooler database in accordance with an embodiment of the present invention.

FIG. 3—Method for Detecting Printers Connected to a Print Server

FIG. 3 is a flowchart of one embodiment of the present invention of a method 300 for detecting printers 102 (FIG. 1) connected to print server 101 (FIGS. 1 and 2) and adding printer attributes of printers 102 to a print spooler database. As stated in the Background Information section, in large scale distributed print spooler systems, the print server may not be able to discover the addition of printers to the network. Consequently, when printers are added in a large scale distributed print spooler system, the attributes of the added printer may have to be manually added to a database, commonly referred to as a print spooler database, in the print server. Manually adding the printer attributes of a significant number of printers may be time consuming and prone to errors. In some print spooler systems, the print server may be able to locate printers connected to the print server using a specific, not widely available, protocol such as Service Location Protocol (SLP), Service Support Transfer Protocol (SSTP) or RVP (RendezVous Protocol). However, in a large distributed print spooler system, using such protocols may not be practical in locating printers connected to the print server as each printer may respond to different specific protocols. Therefore, there is a need in the art to locate printers in a large scale distributed print spooler system using a widely available protocol, e.g., HyperText Transport Protocol (HTTP), and automatically adding the printer (printer attributes) to the print spooler database. Method 300 is a method for locating printers 102 connected to print server 101 using a widely available protocol, such as HTTP, and automatically adding the printer attributes of printers 102 to the print spooler database.

Referring to FIG. 3, in conjunction with FIGS. 1-2, in step 301, print server 101 transmits an inter networking communication protocol request, e.g., HTTP request, to every internet protocol (IP) address in a range of IP addresses. The HTTP requests may be transmitted to devices other than printers 102 with a valid IP address within the range of IP addresses that print server 101 transmitted the HTTP requests.

In step 302, a determination is made by print server 101 as to whether a response, e.g., receiving documents (web pages) in HyperText Markup Language (HTML) (or other mark up language) format, was received from any of the devices that received the HTTP request transmitted in step 301. If print server 101 did not receive any response from any of the devices that received the HTTP request transmitted in step 301, then method 300 is terminated in step 303. However, if one or more of the devices that received the HTTP request transmitted a response to printer server 101, then print server 101, in step 304, determines if each device that transmitted a response is a printer. A device may respond to the HTTP request if the device contains a web server where a web server may refer to the ability of providing world wide web services, e.g., manage HTTP requests, delivering documents (web pages) in HTML (or any other markup language) format.

As stated above, printer server 101 determines if the device that transmitted a response to print server 101 is a printer in step 304. In one embodiment, print server 101 may determine if the device that transmitted a response is a printer by searching for key words, e.g., printer, input/output, in the HTML (or other extensible language) page received from the device.

If the device is not a printer, then print server 101, in step 305, does not attempt to communicate with the device to obtain printer attribute information. If, however, print server 101 determines that the device(s) that transmitted a response are printers, then, in step 306, print server 101 identifies one or more printers. In step 307, print server 101 attempts to communicate with those device(s) identified as printers to obtain printer attribute information using a first communication protocol, e.g., simple network management protocol (SNMP).

For each device identified as a printer, the following steps, steps 308-314, may occur. In step 308, a determination is made as to whether print server 101 receives a response from the device. If print server 101 receives a response from the device, then print server 101, in step 309, obtains printer attribute information. For example, printer attribute information may include the type of printer, the location of the printer, text printing attributes, raster printing attributes, vector printing attributes, command attributes, feature attributes, and option attributes. In step 310, print server 101 updates a print spooler database using the obtained printer attribute information.

If, however, print server 101 did not receive a response from the device, then, in step 311, print server 101 attempts to communicate with the device to obtain printer attribute information using a second communication protocol, e.g., Printer Job Language (PJL). In step 312, a determination is made as to whether print server 101 receives a response from the device. As stated above, if print server 101 receives a response from the device, then print server 101 obtains printer attribute information in step 309 and updates the print spooler database using the obtained printer attribute information in step 310.

However, if print server 101 did not receive a response from the device, then, in step 313, print server 101 attempts to communicate with the device to obtain printer attribute information using a third communication protocol, e.g., Internet Printing Protocol (IPP). Similarly, as stated above, a determination is made in step 314 as to whether print server 101 received a response from the device. If print server 101 received a response from the device, then print server obtains printer attribute information from the device in step 309 and updates the print spooler database using the obtained printer attribute information in step 310. However, if print server 101 did not receive a response, then method 300 is terminated in step 303.

It is noted that print server 101 may attempt to communicate with the device using any number of communication protocols, e.g., ten communication protocols, and that FIG. 3 is illustrative. Furthermore, method 300 illustrates a method for detecting printers 102 connected to print server 101 without knowing the IP address associated with printers 102. However, print server 101 may be provided with an IP address of newly added devices to print spooler system 100 and determine if these newly added devices are printers using method 400 as discussed below in conjunction with FIG. 4. It is further noted that method 300 may be executed in a different order presented and that the order presented in the discussion of FIG. 3 is illustrative. It is further noted that certain steps in method 300 may be executed in a substantially simultaneous manner.

Figure 4:
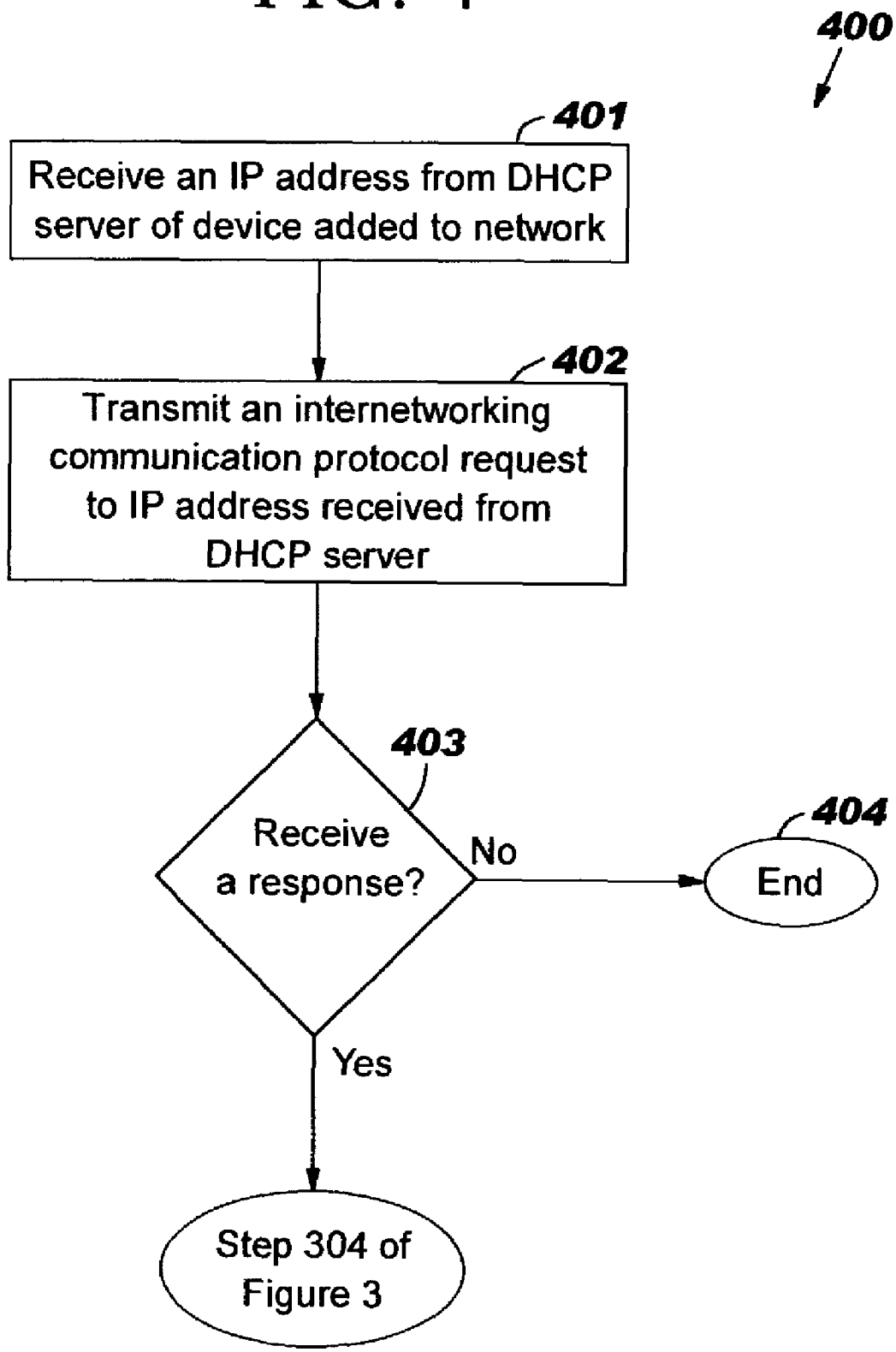
FIG. 4 is a flowchart of a method for discovering printers connected to the print server using an IP address of a newly added device to the print spooler system received from the DHCP server in accordance with an embodiment of the present invention.

FIG. 4—Method for Discovering Printers Connected to a Print Server Using an IP Address of a Newly Added Device to the System FIG. 4 is a flow chart of one embodiment of the present invention of a method 400 for discovering printers 102 (FIG. 1) connected to print server 101 (FIGS. 1 and 2) using an IP address of a newly added device to print spooler system 100 (FIG. 1) received from a server 107, e.g., DHCP server, (FIGS. 1 and 2).

Referring to FIG. 4, in conjunction with FIGS. 1 and 2, in step 401, print server 101 receives an IP address from server 107 of a device added to print spooler system 100. As stated above, server 107 may be configured to assign an IP address to all newly added devices to system 100. Server 107 may further be configured to transmit the newly assigned IP address to print server 101.

In step 402, print server 101 transmits an inter networking communication protocol request, e.g., HTTP request, to the IP address received from server 107. In step 403, a determination is made as to whether print server 101 receives a response from the newly added device. If print server 101 does not receive a response from the newly added device, then method 400 is terminated in step 404. Otherwise, method 400 proceeds to step 304 of method 300 executing the remaining steps of method 300.

It is noted that method 400 may be executed in a different order presented and that the order presented in the discussion of FIG. 4 is illustrative. It is further noted that certain steps in method 400 may be executed in a substantially simultaneous manner.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for discovering printers connected to a print server comprising the steps of:
    transmitting a first communication protocol request to every Internet Protocol (IP) address in a range of IP addresses;
    receiving a first communication protocol response to the first communication protocol request from one or more devices at one or more IP addresses in the range of IP addresses;
    identifying which of the one or more devices are printers as opposed to non-printer devices based on the first communication protocol response, wherein identifying further comprises searching for one or more keywords in the response received from the one or more devices, wherein the one or more keywords indicate if a device is a printer; and
    attempting to communicate with each of the one or more devices identified as printers to obtain printer attribute information, wherein attempting to communicate with a device comprises:
        transmitting a first request to the device for printer attribute information using a second communication protocol;
        determining whether a response to the first request was received from the device; and
        updating a database with the obtained printer attribute information responsive to determining that the response to the first request was received from the device.

2. The method as recited in claim 1, wherein attempting to communicate with each of the one or more devices identified as printers further comprises:
    transmitting a second request for printer attribute information using a third communication protocol responsive to determining that the device did not transmit a response to the first request;
    receiving a response to the second request; and
    updating the database with the obtained printer attribute information responsive to receiving the response to the second request.

3. The method as recited in claim 1, wherein the first communication protocol comprises HyperText Transport Protocol (HTTP), and
    wherein transmitting the first communication protocol request to every IP address in the range of IP addresses further comprises transmitting an HTTP request to each IP address in the range of IP addresses.

4. The method as recited in claim 3, wherein the one or more devices identified as printers comprise a web server adapted to manage HTTP requests and the response to the first communication protocol request comprises a web page.

5. The method as recited in claim 1, wherein the second communication protocol comprises simple network management protocol (SNMP), Printer Job Language (PJL) or Internet Printing Protocol (IPP).

6. The method as recited in claim 1 further comprising the steps of:
    receiving an IP address of a device added to a system;
    transmitting the first communication protocol request to the received IP address; and
    determining if the device added to the system is a printer if a response to the first communication protocol request is received from the device added to the system.

7. A computer-readable medium comprising a program for discovering printers connected to a print server comprising the programming steps of:
    transmitting a first communication protocol request to every Internet Protocol (IP) address in a range of IP addresses;
    receiving a first communication protocol response to the first communication protocol request from one or more devices at one or more IP addresses in the range of IP addresses;
    identifying which of the one or more devices are printers as opposed to non-printer devices based on the first communication protocol response, wherein identifying further comprises searching for one or more keywords in the response received from the one or more devices, wherein the one or more keywords indicate if a device is a printer; and
    attempting to communicate with each of the one or more devices identified as printers to obtain printer attribute information, wherein attempting to communicate with a device comprises:
        transmitting a first request to the device for printer attribute information using a second communication protocol;
        determining whether a response to the first request was received from the device; and
        updating the database with the obtained printer attribute information responsive to determining that the response to the first request was received from the device.

8. The computer-readable medium as recited in claim 7, further comprising the programming steps of:
    transmitting a second request for printer attribute information using a third communication protocol responsive to determining that the device did not transmit a response to the first request;
    receiving a response to the second request; and
    updating a database with the obtained printer attribute information responsive to receiving the response to the second request.

9. The computer-readable medium as recited in claim 7, wherein the first communication protocol comprises HyperText Transport Protocol (HTTP), and the computer readable medium further comprises the programming step of:
transmitting an HTTP request to each IP address in the range of IP addresses.

10. The computer-readable medium as recited in claim 9, wherein the one or more devices identified as printers comprise a web server adapted to manage HTTP requests and the response to the first communication protocol request comprises a web page.

11. The computer-readable medium as recited in claim 7, wherein the second communication protocol comprises simple network management protocol (SNMP), Printer Job Language (PJL) or Internet Printing Protocol (IPP).

12. The computer-readable medium as recited in claim 7 further comprising the programming steps of:
receiving an IP address of a device added to a system;
transmitting the first communication protocol request to the received IP address; and
determining if the device added to the system is a printer if a response to the first communication protocol request is received from the device added to the system.

13. A print server, comprising:
a memory unit operable for storing a computer program operable for discovering printers connected to said print server; and
a processor coupled to said memory unit, wherein said processor, responsive to said computer program, comprises:
circuitry operable for transmitting a first communication protocol request to every Internet Protocol (IP) address in a range of IP addresses;
circuitry operable for receiving a first communication protocol response to the first communication protocol request from one or more devices at one or more IP addresses in the range of IP addresses;
circuitry operable for identifying which of the one or more devices are printers as opposed to non-printer devices based on the first communication protocol response, wherein the circuitry operable for identifying comprises circuitry operable for searching for one or more keywords in the response received from the one or more devices, wherein the one or more keywords indicate if a device is a printer; and
circuitry operable for attempting to communicate with each of the one or more devices determined to be printers to obtain printer attribute information, wherein the circuitry operable for attempting to communicate with a device comprises:
circuitry operable for transmitting a first request to the device for printer attribute information using a second communication protocol;
circuitry operable for determining whether a response to the first request was received from the device; and
circuitry operable for updating a database with the obtained printer attribute information responsive to determining that the response to the first request was received from the device.

14. The print server as recited in claim 13, wherein the processor further comprises:
circuitry operable for transmitting a second request for printer attribute information using a third communication protocol responsive to determining that the device did not transmit a response to the first request;
circuitry operable for receiving a response to the second request; and
circuitry operable for updating the database with the obtained printer attribute information responsive to receiving the response to the second request.

15. The print server as recited in claim 13, wherein the first communication protocol comprises HyperText Transport Protocol (HTTP) and the processor further comprises:
circuitry operable for transmitting an HTTP request to each IP address in the range of IP addresses.

16. The print server as recited in claim 13, wherein the one or more devices identified as printers comprise a web server adapted to manage HTTP requests and the response to the first communication protocol request comprises a web page.

17. The print server as recited in claim 13, wherein the second communication protocol comprises simple network management protocol (SNMP), Printer Job Language (PJL) or Internet Printing Protocol (IPP).

18. The print server as recited in claim 17, wherein the processor further comprises:
circuitry operable for receiving an IP address of a device added to a system;
circuitry operable for transmitting the first communication protocol request to the received IP address; and
circuitry operable for determining if the device added to the system is a printer if a response to the first communication protocol request is received from the device added to the system.

* * * * *